United States Patent
O'Keefe et al.

(10) Patent No.: US 9,504,318 B1
(45) Date of Patent: Nov. 29, 2016

(54) APPARATUS FOR PROVIDING UTILITY RECEPTACLES ON A WORK SURFACE

(71) Applicant: Premier Manufacturing Group, Inc., Shelton, CT (US)

(72) Inventors: Michael O'Keefe, Wethersfield, CT (US); Bernard Bensussan, Monroe, CT (US); David Black, Orange, CT (US); Kevin Richard, Shelton, CT (US)

(73) Assignee: Premier Manufacturing Group, Inc., Shelton, CT (US)

( * ) Notice: Subject to any disclaimer, the term of this patent is extended or adjusted under 35 U.S.C. 154(b) by 20 days.

(21) Appl. No.: 14/749,008

(22) Filed: Jun. 24, 2015

(51) Int. Cl.
| | |
|---|---|
| *H01R 13/60* | (2006.01) |
| *A47B 21/06* | (2006.01) |
| *H01R 25/00* | (2006.01) |
| *H02G 3/18* | (2006.01) |

(52) U.S. Cl.
CPC ............. *A47B 21/06* (2013.01); *H01R 25/006* (2013.01); *H02G 3/18* (2013.01); *A47B 2021/066* (2013.01)

(58) Field of Classification Search
CPC ............ H01R 13/447; H01R 13/5213; H01R 13/639; H01R 13/6395; H02G 3/081; H02G 3/18; H02G 3/126; H02G 3/086; H02G 3/0418; H02G 3/10; H02G 3/16
See application file for complete search history.

(56) References Cited

U.S. PATENT DOCUMENTS

| | | | | |
|---|---|---|---|---|
| 5,709,156 | A * | 1/1998 | Gevaert | A47B 21/06 108/26 |
| 7,407,392 | B2 * | 8/2008 | Cooke | A47B 21/06 108/62 |
| 7,614,889 | B1 * | 11/2009 | Black | H01R 13/5213 174/67 |
| 7,901,224 | B1 * | 3/2011 | Black | A47B 21/06 439/142 |
| 8,317,537 | B1 * | 11/2012 | Black | A47B 21/06 439/142 |
| 8,512,072 | B1 * | 8/2013 | Black | A47B 21/06 439/142 |
| 9,112,298 | B1 * | 8/2015 | Hayden | H02G 3/185 |
| 9,368,924 | B2 * | 6/2016 | Byrne | H01R 13/73 |

* cited by examiner

*Primary Examiner* — Xuong Chung Trans
(74) *Attorney, Agent, or Firm* — Raymond A. Nuzzo

(57) ABSTRACT

An apparatus for providing utility receptacles on a work surface. The apparatus has a housing structure having a pair of sidewalls, a rear wall, a bottom section and a top section that is attached to the sidewalls. The top section includes a central section and at least one bendable tab extending from the central section to a distal end. The central section has at least one opening therein that is sized and shaped to receive a utility receptacle. The central section has a transverse slot along which the bendable tab can be bent with respect to the central section. The bendable tab can be bent 90° with respect to the central section. The bendable tab has at least one transverse slot along which a first portion of the bendable tab can be bent with respect to a second portion of the bendable tab.

23 Claims, 12 Drawing Sheets

APPARATUS FOR PROVIDING UTILITY RECEPTACLES ON A WORK SURFACE

STATEMENT OF GOVERNMENT INTEREST

Not applicable.

CROSS REFERENCE TO OTHER PATENT APPLICATIONS

Not applicable.

TECHNICAL FIELD

The present invention generally relates to an apparatus for providing utility receptacles on a work surface of an article of furniture such as a table, desk, workbench, workstation or similar article.

BACKGROUND

Devices that provide electrical power and data receptacles on a work surface are known in the art. These devices are typically mounted within a cut-out or opening formed in the work surface. Typical prior art devices for providing electrical power and data receptacles on work surfaces of workbenches, workstations and similar articles of furniture are described in U.S. Pat. Nos. 5,709,156, 7,407,392, 7,407,392, 7,614,889 and 7,901,224.

SUMMARY

In some embodiments, the invention is directed to an apparatus for providing utility receptacles on a work surface. The apparatus comprises a housing structure having a pair of sidewalls that are substantially parallel to each other. The housing structure further comprises a top section that is attached to sidewalls. The top section comprises a central section that has an opening for receiving a utility receptacle. The top section further comprises at least one bendable tab extending from the central section to a distal end. The central section has a transverse slot along which the bendable tab can be bent with respect to the central section. The bendable tab has at least one transverse slot along which a first portion of the bendable tab can be bent with respect to a second portion of the bendable tab.

In some embodiments, the invention is directed to an apparatus for providing utility receptacles on a work surface. The apparatus comprises a housing structure comprising a pair of sidewalls, a front wall, a rear wall, a bottom section and a top section, wherein the sidewalls, front wall, rear wall, bottom section and top section form a compartment within the housing structure. The top section comprises a central section that has a first opening for receiving a utility receptacle. The top section includes a second opening. The top section further comprises at least one bendable tab extending from the central section to a distal end. The central section has a transverse slot along which the bendable tab can be bent with respect to the central section. The bendable tab has at least one transverse slot along which a first portion of the bendable tab can be bent with respect to a second portion of the bendable tab. The apparatus further comprises a device charging port assembly that is positioned within the compartment and comprises a device charging port. The device charging port is aligned with the second opening in the central section. The apparatus further comprises a cover member that is attached to the top section. The cover member has a top side, a first opening aligned with the first opening of the central section and a second opening that is aligned with the second opening of the central section. The apparatus further comprises a utility receptacle mounted to the central section and positioned within the first opening of the central section. The utility receptacle has a front portion and a rear portion. The front portion of the utility receptacle is within the first opening of the cover member. The rear portion of the utility receptacle extends through the first opening of the central section and protrudes into the compartment. In one embodiment, the utility receptacle is an electrical power receptacle In some embodiments, the present invention is directed to an apparatus for providing utility receptacles on a work surface comprising a housing structure having a pair of sidewalls, a rear wall that is transversely attached to the sidewalls and a bottom section. The sidewalls are substantially parallel to each other and substantially perpendicular to the rear wall and the bottom section. The housing structure further comprises a top section that is attached to the sidewalls. The top section further comprises a central section and at least one bendable tab extending from the central section to a distal end. The central section has a transverse bend line along which the bendable tab can be bent with respect to the central section. The transverse bend line of the central section is positioned such that the at least one bendable tab can be bent to a position wherein the bendable tab is adjacent to one of the sidewalls. The at least one bendable tab has at least one transverse bend line along which a first portion of the bendable tab can be bent with respect to a second portion of the bendable tab. The central section has at least one opening therein that is sized and shaped to receive a utility receptacle.

DETAILED DESCRIPTION

As used herein, the term "utility receptacle" shall include electrical power receptacles that provide either AC or DC voltages, data communication ports, USB ports, device charging ports, USB charging ports, Power Pole® conductors manufactured by Anderson Power Products, Inc. of Sterling, Mass., RS-232 connectors, RS-422 connectors, RS-485 connectors and telephone line connectors or jacks such as RJ-11, RJ-12, RJ-14, RJ-15, RJ-21X, RJ-25, RJ-31X and RJ-48C.

Figure 1A:
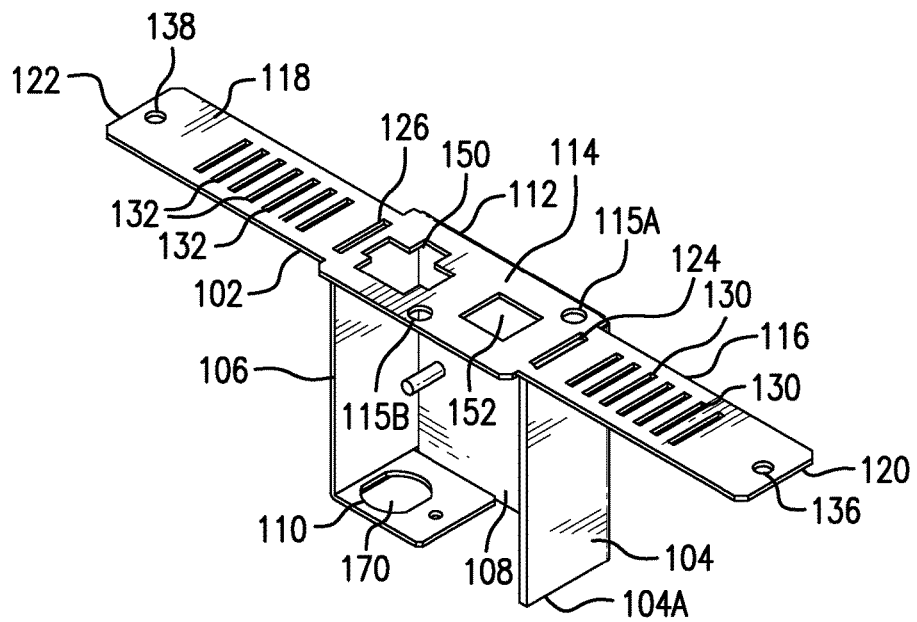
FIG. 1A is a perspective view of a housing structure of an apparatus for providing utility receptacles on a work surface in accordance with one embodiment of the invention, a front panel member of the housing structure not being shown so as to facilitate viewing of the interior of the housing structure.
Figure 1B:
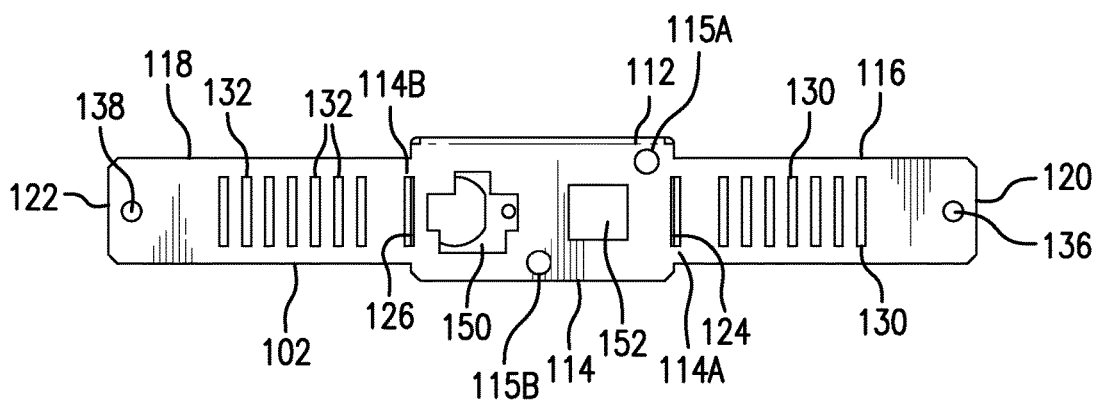
FIG. 1B is a plan view of the housing structure.
Figure 1C:
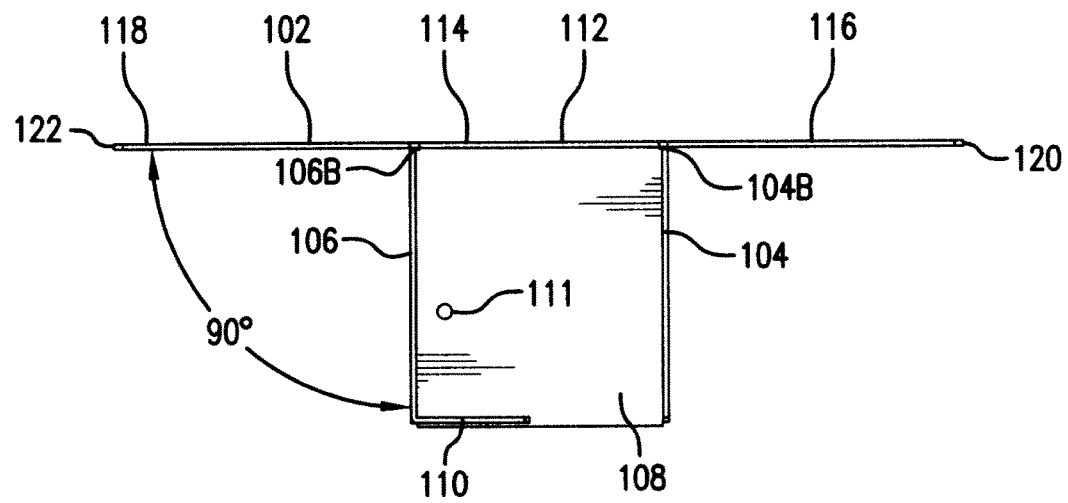
FIG. 1C is a front view of the housing structure.
Figure 1D:
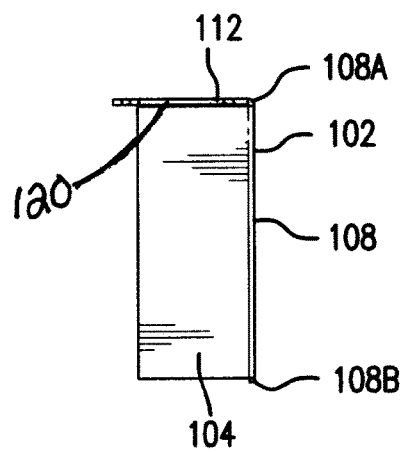
FIG. 1D is a view of the left side of the housing structure.
Figure 1E:
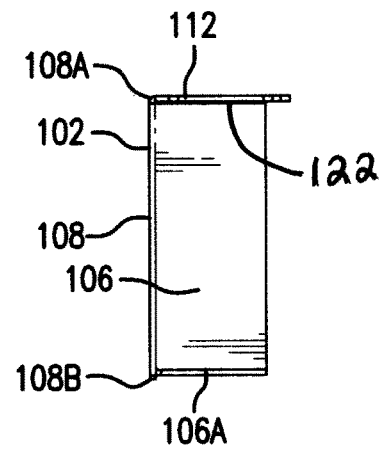
FIG. 1E is a view of the right side of the housing structure.
Figure 1F:
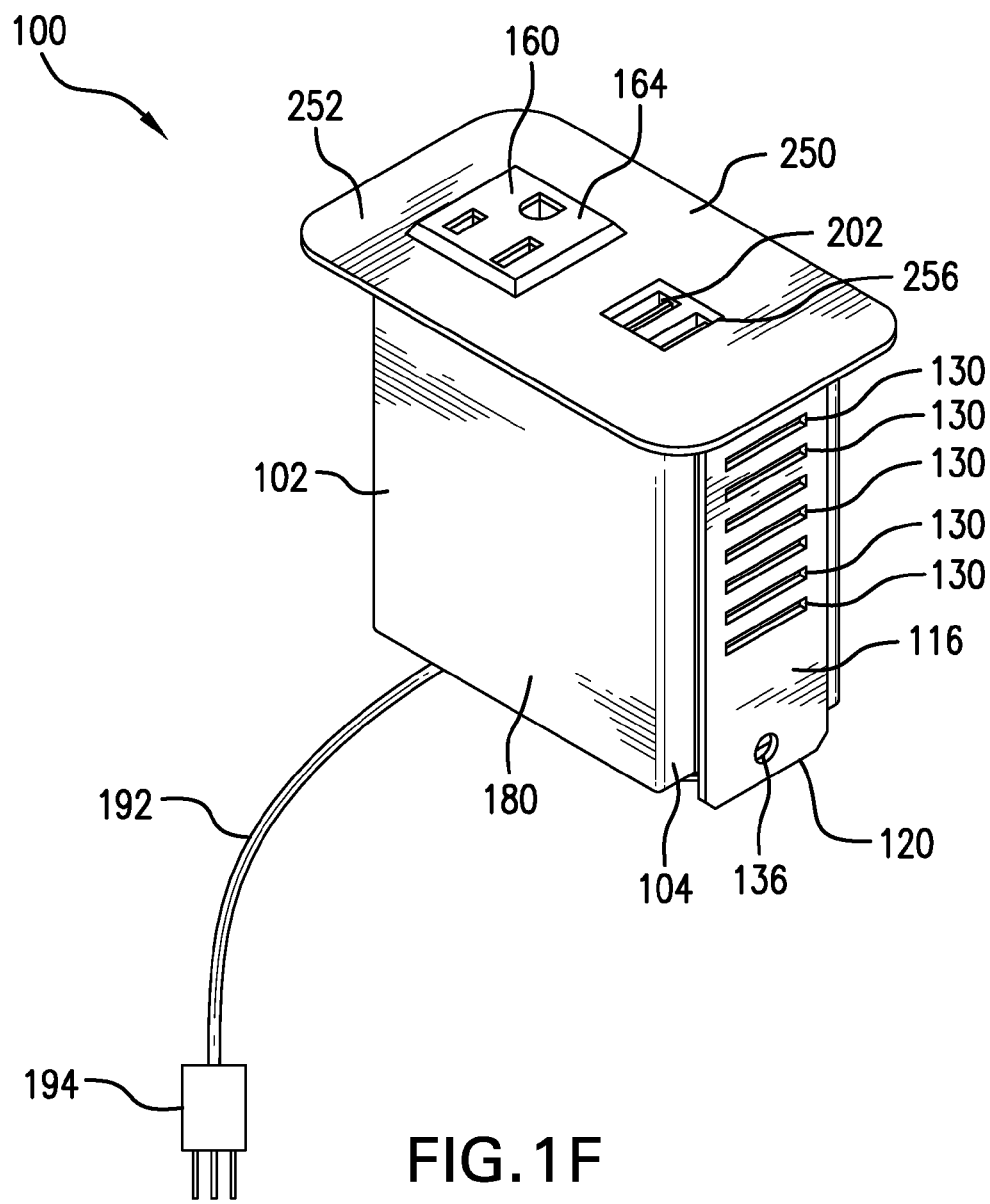
FIG. 1F is a perspective view of the completely assembled apparatus for providing utility receptacles on a work surface.
Figure 1G:
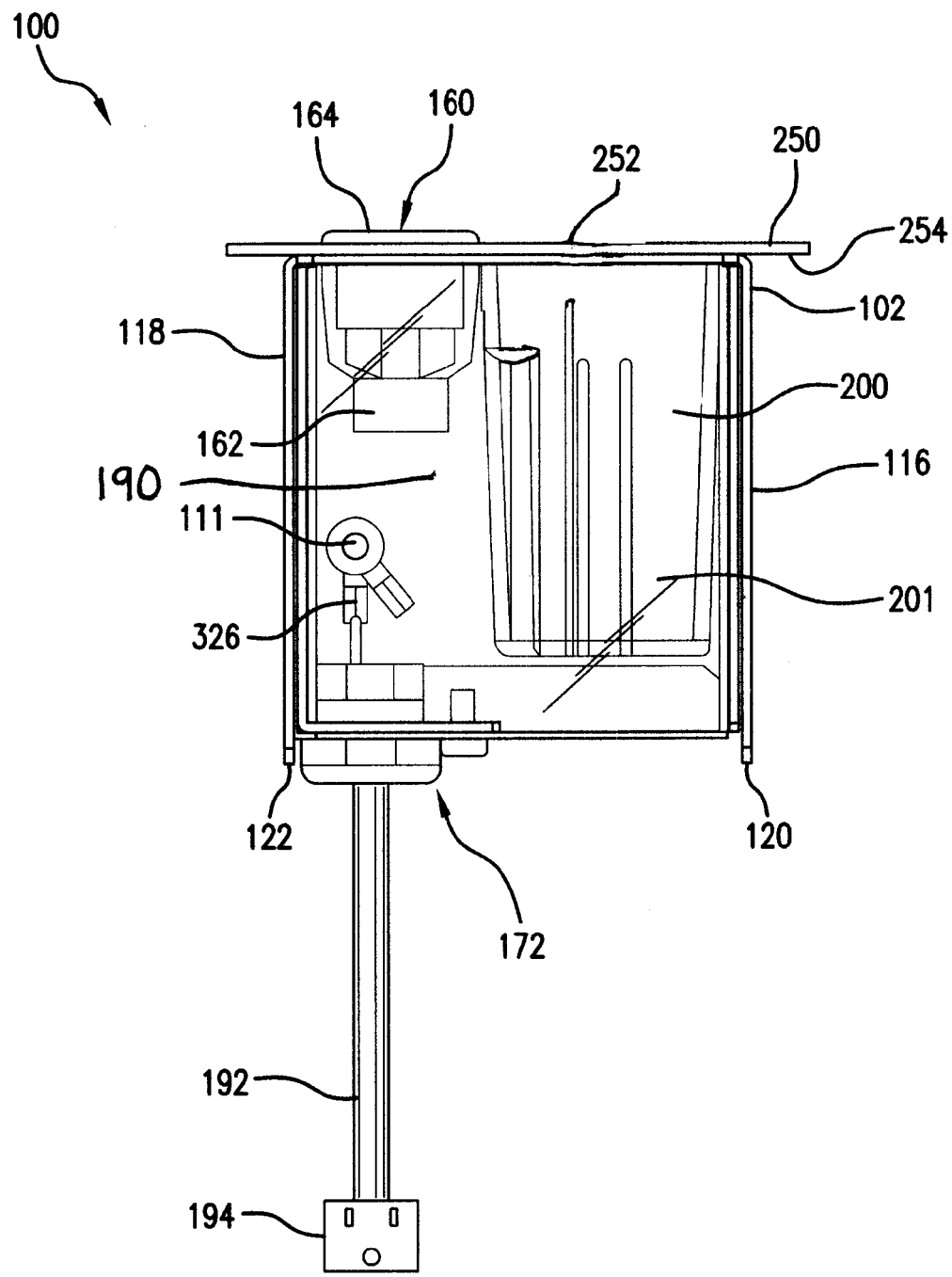
FIG. 1G is front view, in elevation, of the apparatus shown in FIG. 1F, the view not showing a front panel member in order to facilitate viewing of a compartment within the housing structure.
Figure 2:
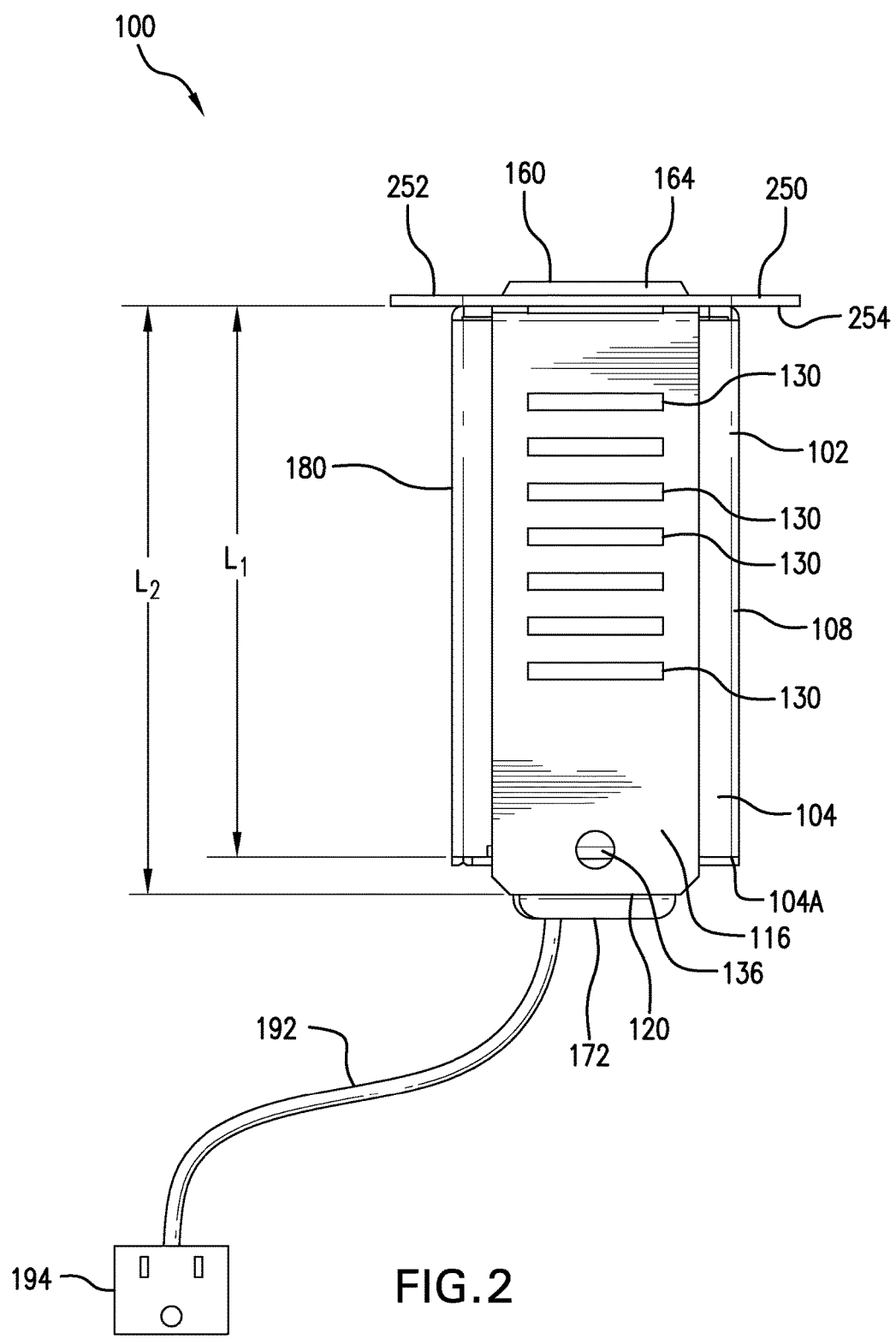
FIG. 2 is a side elevational view of the apparatus shown in FIG. 1F, wherein a bendable tab is bent 90° such that the bendable tab is adjacent to a sidewall of the housing structure.

Referring to FIG. 2, there is shown completely assembled apparatus 100 for providing utility receptacles on a work surface in accordance with one embodiment of the invention. Apparatus 100 comprises a housing structure 102 that is shown in FIGS. 1A-F. Housing structure 102 comprises a pair of sidewalls 104 and 106, and a transverse rear wall 108 that is transversely attached to sidewalls 104 and 106. Sidewall 104 has a bottom edge 104A and a top edge 104B. Sidewall 106 has a bottom edge 106A and a top edge 106B. Transverse rear wall 108 has a top edge 108A and a bottom edge 108B. Structure 102 includes bottom section 110. In one embodiment, bottom section 110 is attached only to sidewall 106. In one embodiment, bottom section 110 is attached to bottom edge 106A of sidewall 106. In another embodiment, bottom section 110 is integrally formed with sidewall 106. In one embodiment, bottom section 110 is attached to sidewall 106 and transverse rear wall 108. In another embodiment, the bottom section 110 is attached to sidewalls 104 and 106 and transverse rear wall 108. In another embodiment, bottom section 110 is attached to the bottom edges 106A and 108B of sidewall 106 and transverse rear wall 108, respectively. Sidewalls 104 and 106 are substantially parallel to each other and substantially perpendicular to transverse rear wall 108 and bottom section 110. An electrically conductive post member 111 is attached to transverse wall 108 (see FIG. 1C). Ground terminal 326 (see FIG. 1G) is connected to post member 111. Housing structure 102 further comprises top section 112 that is attached to the top edges 104B and 106B of sidewalls 104 and 106, respectively. In one embodiment, top section 112 is also attached to the top edge 108A of transverse rear wall 108. Top section 112 comprises central section 114. Central section 114 has first end portion 114A and second end portion 114B. Central section 114 includes openings 115A and 115B. The purpose of openings 115A and 115B is described in the ensuing description. Top section 112 further comprises bendable tab 116 which extends from first end portion 114A of central section 114. Top section 112 further comprises bendable tab 118 that extends from second end portion 114B of central section 114. Bendable tab 116 extends to distal end 120 and bendable tab 118 extends to distal end 122. Prior to being bent, bendable tabs 116 and 118 are coplanar with central portion 114 as shown in FIGS. 1A-E.

Figure 5A:
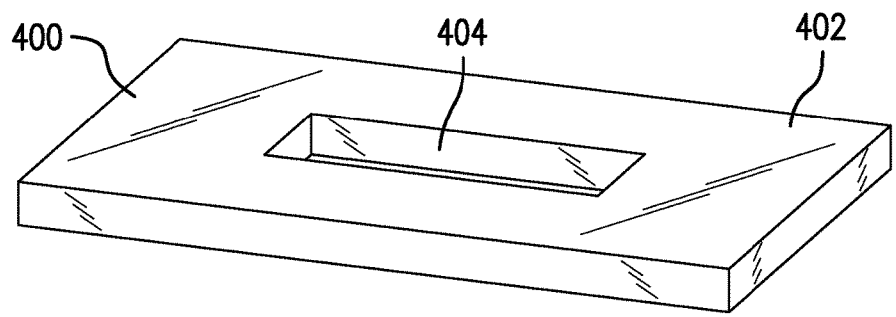
FIG. 5A is a perspective view of a work surface that is part of an article of furniture.
Figure 5B:
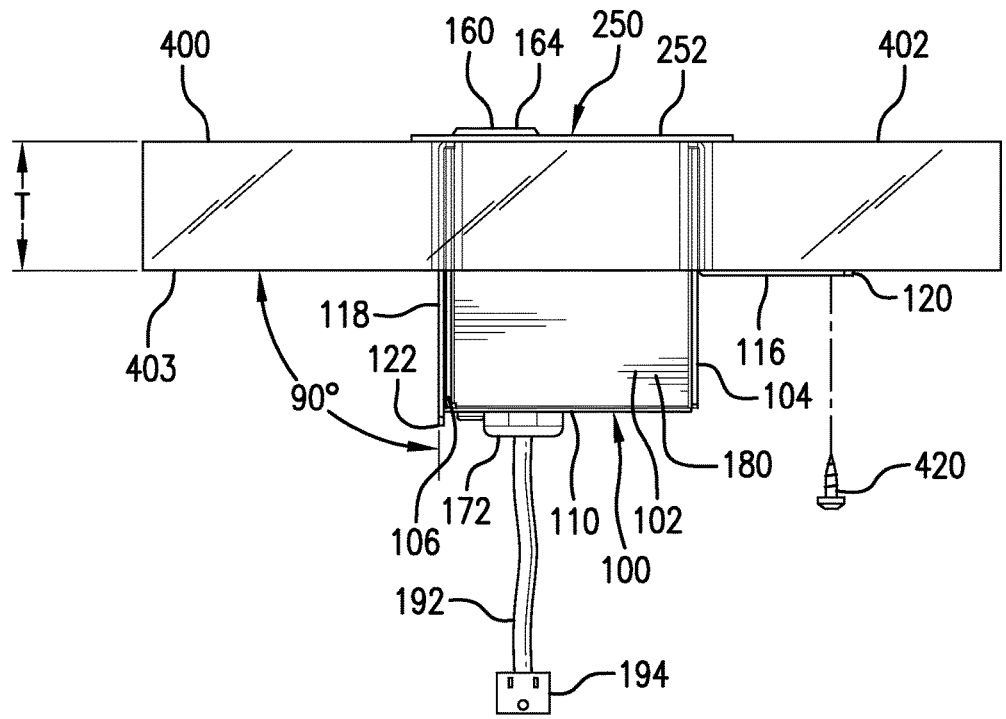
FIG. 5B is a side elevational view showing the apparatus of FIG. 1F mounted to the work surface shown in FIG. 5A, the view showing a portion of the bendable tab bent upward along a transverse slot to a 90° position such that the bendable tab contacts an underside of the work surface.

Central portion 114 includes openings 124 and 126 that are in the form of transverse slots. Bendable tab 116 can be bent about transverse slot 124 so that bendable tab 116 is adjacent to sidewall 104 as shown in FIGS. 1F, 1G and 2. Thus, bendable tab 116 can be bent 90°. Similarly, bendable tab 118 can be bent about transverse slot 126 so that bendable tab 118 is adjacent to sidewall 106 as shown in FIGS. 1G and 5B. Thus, bendable tab 118 can be bent about 90°. Bendable tab 116 has at least one opening 130 that is in the form of a transverse slot. In one embodiment, bendable tab 116 has a plurality of transverse slots 130. In one embodiment, transverse slots 130 are equidistantly spaced. The transverse slots 130 allow a first portion 116A of the bendable tab 116 to be bent with respect to a second portion 116B of the bendable tab 116 (see FIG. 3). Similarly, bendable tab 118 has at least one opening 132 that is in the form of a transverse slot. In one embodiment, bendable tab 118 has a plurality of transverse slots 132. In one embodiment, transverse slots 132 are equidistantly spaced. The transverse slots 132 allow a first portion of bendable tab 118 to be bent with respect to a second portion of bendable tab 118. The purpose and function of transverse slots 130 and 132 are described in the ensuing description.

Bendable tab 116 has thru-hole 136 in proximity to distal end 120. Thru-hole 136 is sized to receive a fastener such as a screw, bolt or nail. Similarly, bendable tab 118 has thru-hole 138 in proximity to distal end 122. Thru-hole 138 is sized to receive a fastener such as a screw, bolt or nail.

Referring to FIGS. 1C, 1F and 2, each sidewall 104 and 106 has the same length L1. In one embodiment, each bendable tab 116 and 118 has a predetermined length L2 that is relatively greater than length L1 such that when bendable tab 116 is bent 90° so that it is adjacent to sidewall 104, distal end 120 of bendable tab 116 extends beyond bottom edge 104A of sidewall 104, and when bendable tab 118 is bent 90° so that it is adjacent to sidewall 106, the distal end 122 of bendable tab 118 extends beyond bottom edge 106A of sidewall 106 (see FIG. 1E). Housing structure 102 further comprises front wall 180 that is transversely attached to sidewalls 104 and 106 so as to form compartment 190.

Referring to FIGS. 1A and 1B, central portion 114 of top section 112 has cut-out or opening 150 and cut-out or opening 152. Apparatus 100 further comprises utility receptacle 160. In one embodiment, utility receptacle 160 is configured as an electrical power receptacle. Electrical power receptacle 160 comprises rear portion 162 and front portion 164. Electrical power receptacle 160 is fitted within opening 150 such that rear portion 162 protrudes into compartment 190. In one embodiment, fasteners (e.g. screws, clips, brackets, etc.) are used to keep electrical power receptacle 160 positioned within opening 150. Opening 152 of central section 114 is sized to provide access to another utility receptacle 202. In one embodiment, utility receptacle 202 comprises a device charging port which is described in the ensuing description.

Figure 6A:
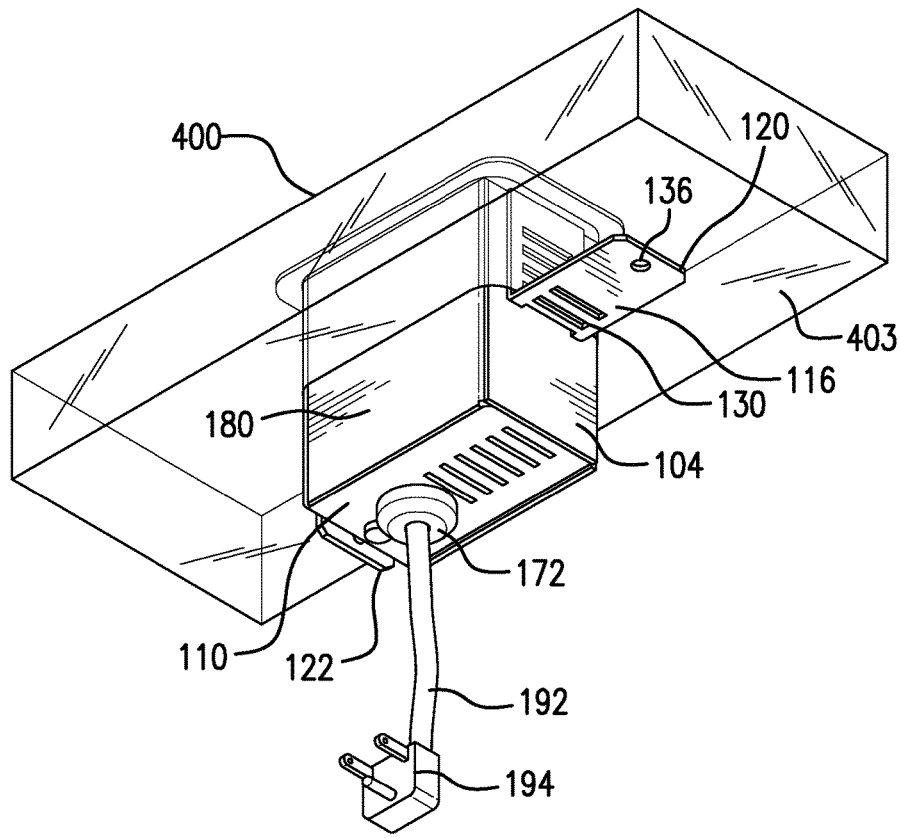
FIG. 6A is a perspective view showing the bottom of the apparatus of FIG. 1F and the underside of the work surface shown in FIG. 5B.
Figure 6B:
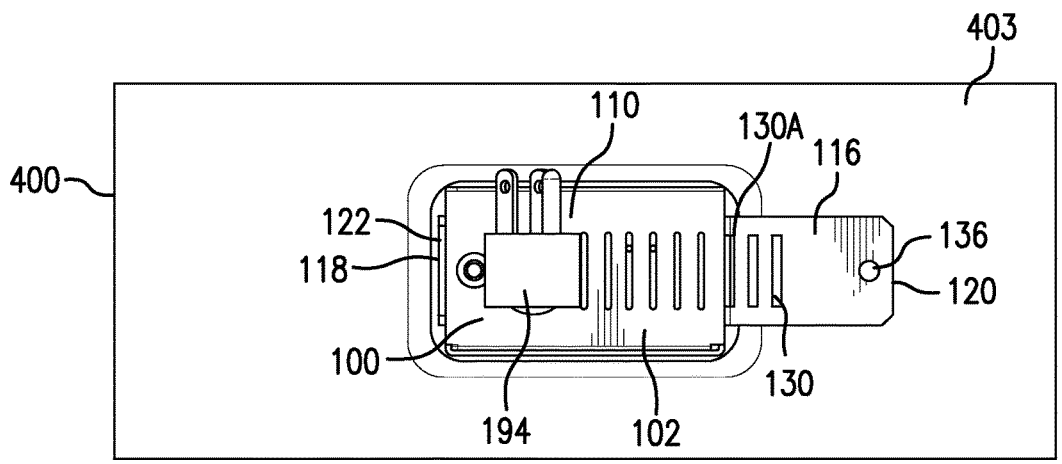
FIG. 6B is a bottom view of the apparatus of FIG. 1F mounted to the work surface.

Referring to FIGS. 1G, 5B and 6A, bottom section 110 includes a cut-out or opening 170 in which cable strain-relief member 172 is tightly positioned. In one embodiment, front wall 180 is also attached to bottom section 110. Apparatus 100 further comprises an electrical power cord 192 that extends through strain relief member 172. Electrical power cord 192 has a first end that is located within compartment 190 and electrically connected to electrical power receptacle 160. Electrical power cord 192 has male plug 194 that is configured to be electrically connected to an electrical power source (e.g. A.C. power source). Apparatus 100 includes device charging port assembly 200 that is mounted within compartment 190 and is secured to housing structure 102 via screws, fasteners or any suitable fastening technique. Device charging port assembly 200 comprises assembly housing 201 and device charging port 202 (see FIGS. 1F and 1G). In one embodiment, device charging port 202 is a USB charging port. Device charging port assembly 200 is positioned so that device charging port 202 is aligned with opening 152 of central section 114. Device charging port assembly 200 comprises circuitry that is electrically connected to device charging port 202. Electrical power cord 192 is electrically connected to the circuitry within device charging port assembly 200 and provides a first voltage at a first current to the circuitry within device charging port assembly 200. The circuitry in device charging port assembly 200 converts the first voltage at the first current to a relatively lower second voltage at a relatively lower second current that is suitable for charging electronic devices, e.g. smart phones, iPads, iPod, PDA, etc. This lower second voltage and current are available at device charging port 202.

Figure 1H:
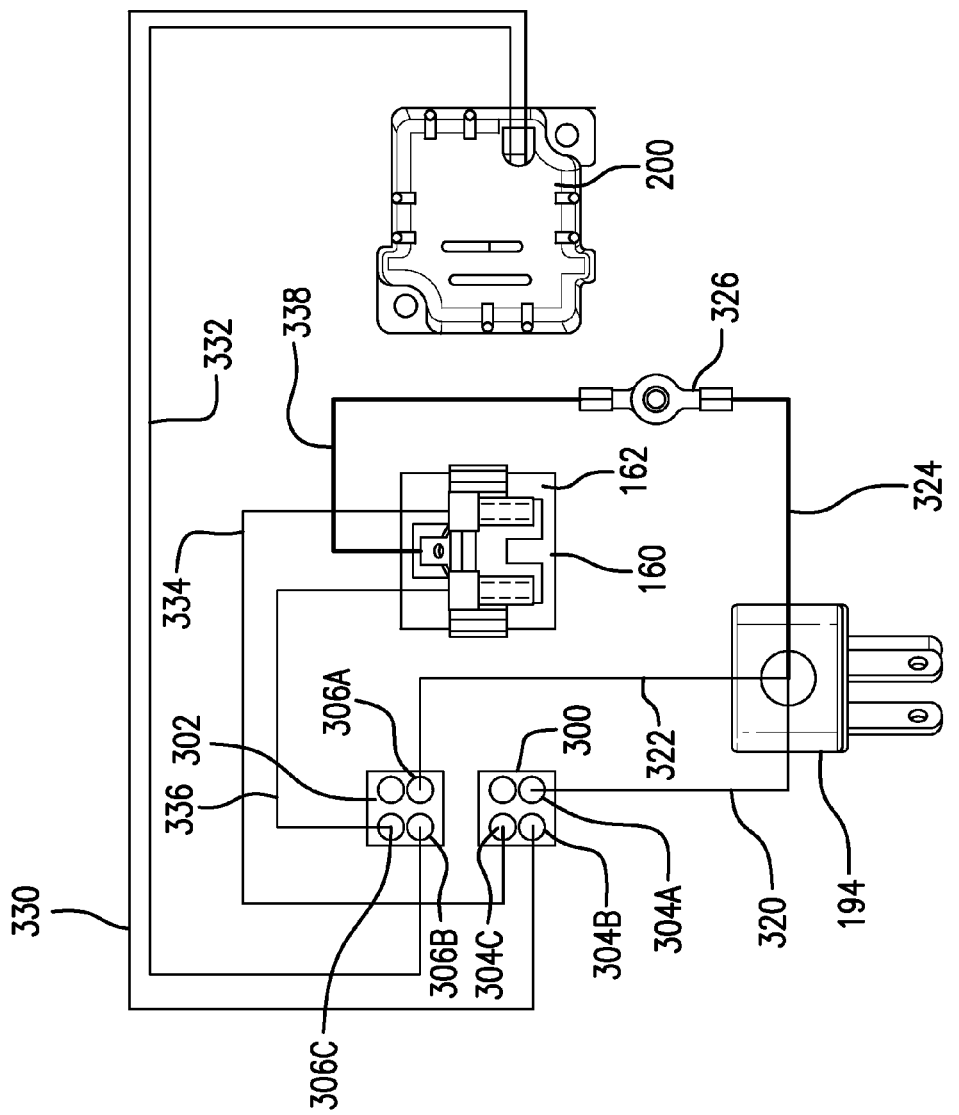
FIG. 1H is a diagram showing the electrical connection of the components of the apparatus shown in FIG. 1F.

Referring to FIG. 1H, there is shown a wiring diagram of apparatus 100. Apparatus 100 includes barrier terminal strips or blocks 300 and 302. Barrier terminal strip 300 includes electrical contacts 304A-C. Contacts 304A, 304B and 304C are electrically connected together. Similarly, barrier terminal strip 302 includes electrical contacts 306A-C. Contacts 306A, 306B and 306C are electrically connected together. The "hot" wire 320 of power cord 192 is electrically connected to electrical contact 304A and neutral wire 322 of electrical power cord 192 is electrically connected to electrical contact 306A. Electrical ground wire 324 of power cord 192 is electrically connected to ground terminal 326. Ground terminal 326 is connected to post 111 (see FIG. 1G). Thus, ground terminal 326 is electrically connected to transverse rear wall 108. Wire 330 is electrically connected to electrical contact 304B and a corresponding electrical contact on device charging port assembly 200. Wire 332 is electrically connected to electrical contact 306B and a corresponding electrical contact on device charging port assembly 200. Wire 334 is electrically connected to electrical contact 304C and a corresponding electrical contact on rear portion 162 of utility receptacle 160. Wire 336 is electrically connected to electrical contact 306C and a corresponding electrical contact on rear portion 162 of utility receptacle 160. Wire 338 is electrically connected to ground terminal 326 and a corresponding electrical ground contact on rear portion 162 of utility receptacle 160.

Referring to FIG. 1F, apparatus 100 further comprises cover member or faceplate 250 that is attached to top section 112. Cover member 250 has top side 252 and bottom side 254. In one embodiment, cover member 250 is removably attached to top section 112. Any suitable fastener or fastening technique may be used to attach cover member 250 to top section 112. In one embodiment, cover member 250 has a pair of standoffs (not shown) that extend outwardly from bottom side 254. Each of these standoffs is sized to fit into a corresponding opening 115A and 115B. Cover member 250 has a first opening therein that is sized to receive front portion 164 of electrical power receptacle 160. Cover member 250 further includes a second opening 256 that is aligned with opening 152 of central section 114 thereby providing access to device charging port 202.

Figure 3:
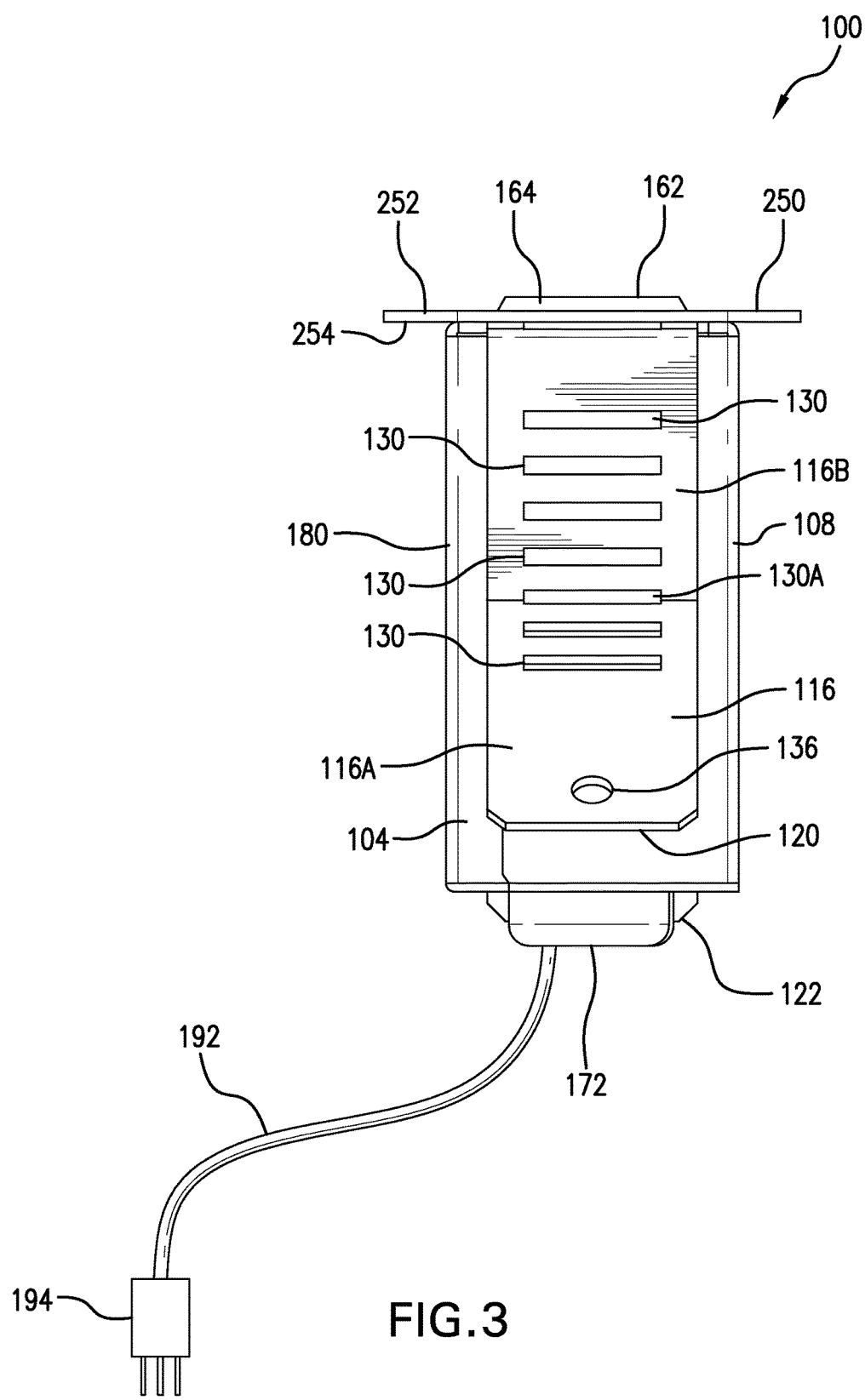
FIG. 3 is a side elevational view of the apparatus as shown in FIG. 1F, wherein a portion of the bendable tab is bent upward along a transverse slot to a 45° position.
Figure 4:
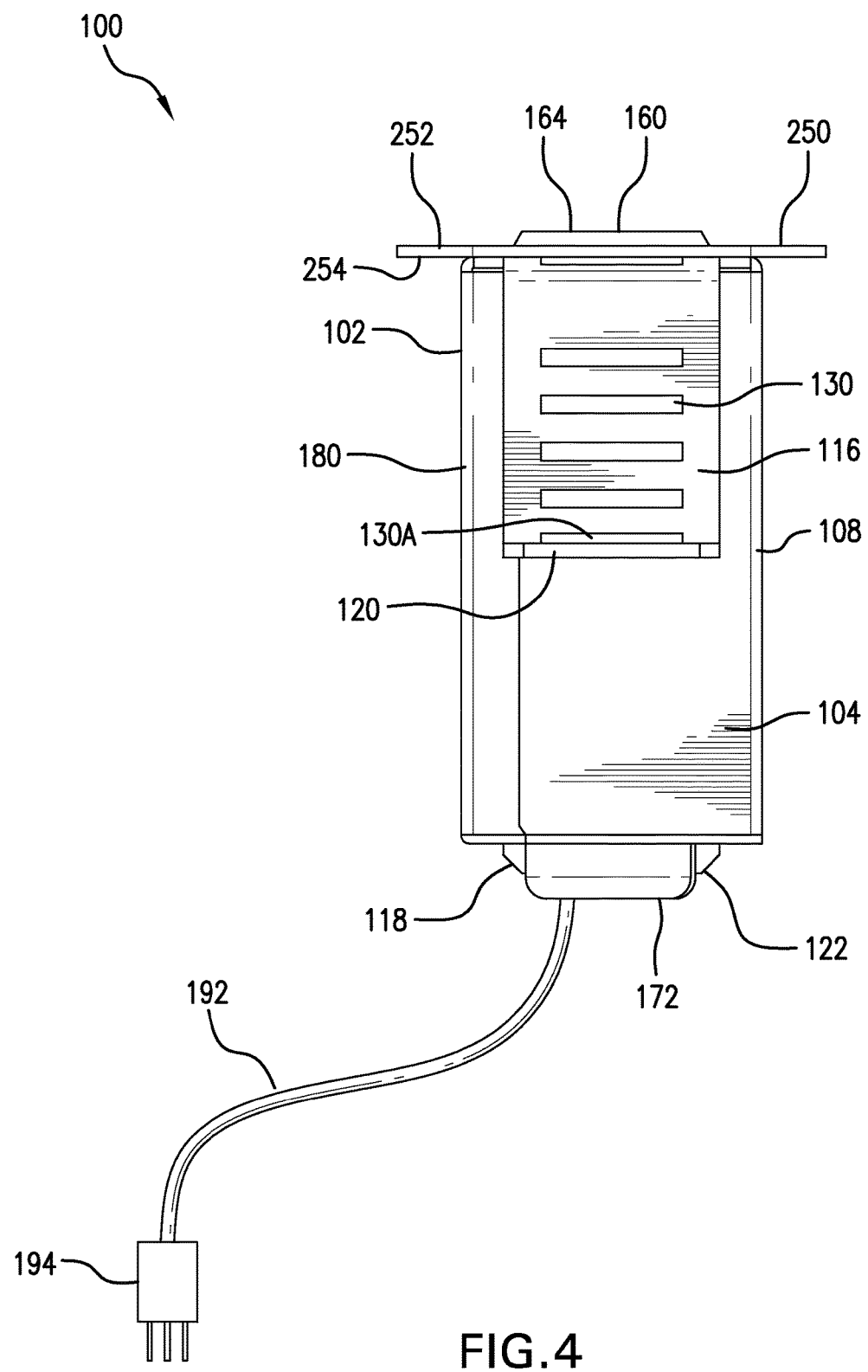
FIG. 4 is a side elevational view of the apparatus as shown in FIG. 1F, wherein the portion of the bendable tab is further bent upward to a 90° position.

Referring to FIGS. 1F and 2, there is shown completely assembled apparatus 100. Bendable tabs 116 and 118 are bent 90° along transverse slots 124 and 126, respectively, so that bendable tabs 116 and 118 are adjacent to sidewalls 104 and 106, respectfully. Since the length of each bendable tab 116 and 118 is relatively greater than the length of sidewalls 104 and 106, distal ends 120 and 122 extend below the bottom edges of sidewalls 104 and 106, respectively. For example, referring to FIG. 2, distal end 120 of bendable tab 116 extends below bottom edge 104A of sidewall 104. FIG. 3 shows a portion of bendable tab 116 bent upward to a 45° position along a particular transverse slot 130, indicated by reference number 130A. Although not shown in the drawing, a portion of bendable tab 118 is also bent upward along one of the transverse slots 132 to a 45° position. FIG. 4 shows bendable tab 116 bent upward along one of the transverse slots 130 to a 90° position. Although not shown in the drawing, bendable tab 118 is also bent upward along one of the transverse slots 132 to a 90° position.

FIGS. 5A, 5B, 6A and 6B illustrate how apparatus 100 is mounted to work surface 400 which is part of an article of furniture such as a table, work bench, conference table, laboratory table or work station, etc. Work surface 400 has a top side 402 and a bottom side 403. The article of furniture includes thru-hole or opening 404 that has a predetermined size that is relatively smaller than the size of cover member 250 but large enough to allow housing structure 102, with bendable tabs 116 and 118 bent downward 90° as shown in FIG. 1F, to pass therethrough. In order to install apparatus 100 on work surface 400, a user or installer grasps apparatus 100 and inserts housing structure 102, with tabs 116 and 118 bent downward 90°, through opening 404 so that bottom side 254 of cover member 250 contacts and rests upon top side 402 of work surface 400. Once housing structure 102 is inserted through opening 404, a user or installer then bends bendable tab 116 about one of the transverse slots 130 to a 90° position, as shown in FIG. 6A, so that bendable tab 116 is against or adjacent to bottom side 403 of work surface 400. The particular transverse slot 130 at which bendable tab 116 is bent depends upon the thickness T of the table, work bench top, etc. (see FIG. 5B). The user or installer then bends bendable tab 118 to a 90° position in the same manner so that bendable tab 118 is against or adjacent to bottom side 403. As an option, the user may insert fasteners, such as screws 420, through openings 136 and 138 of bendable tabs 116 and 118, respectively, in order to further secure bendable tabs 116 and 118 to bottom side 403.

In another embodiment, housing structure 102 is configured with only a single bendable tab. For example, in such an embodiment, housing structure 102 would have either bendable tab 116 or bendable tab 118, but not both. In a further embodiment, there are two or more bendable tabs on each side of housing structure 102.

Figure 7:
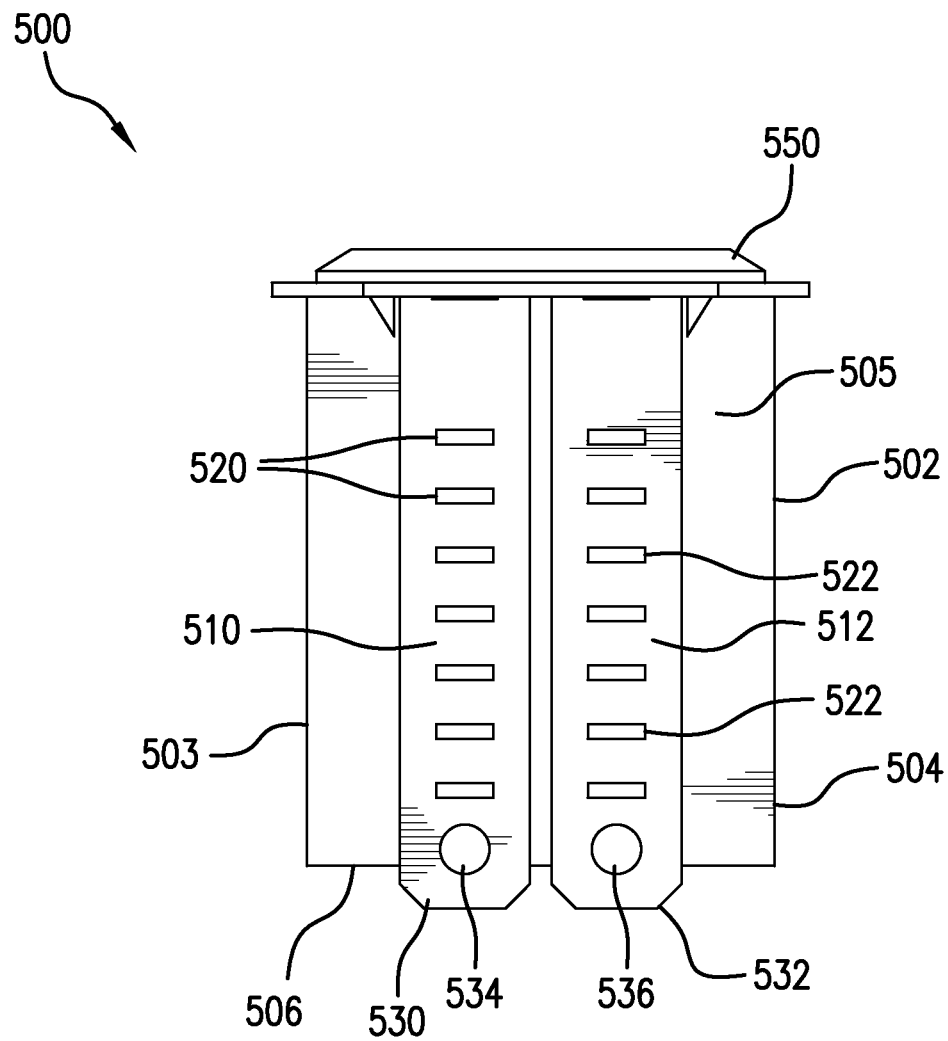
FIG. 7 is a side elevational view of an apparatus for providing utility receptacles on a work surface in accordance with another embodiment of the invention.
Figure 8:
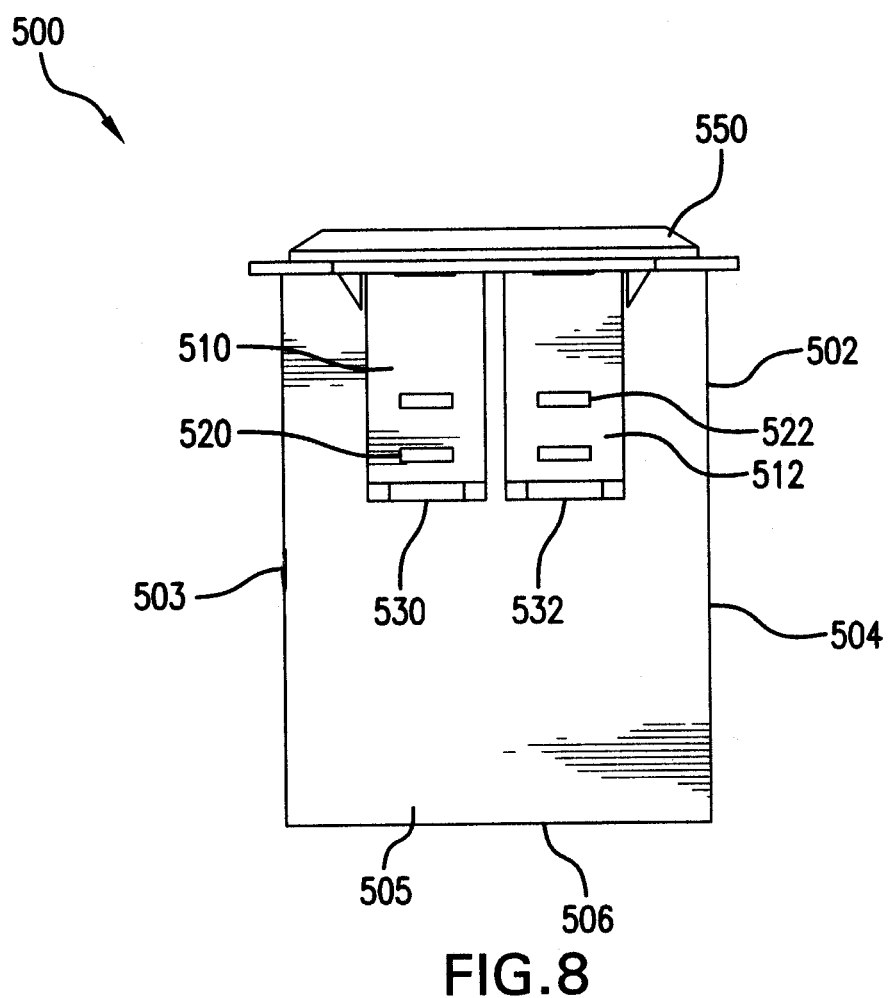
FIG. 8 is a side elevational view of the apparatus of FIG. 7, the view showing portions of the bendable tabs being bent along transverse slots to a 90° position.

In another embodiment, the apparatus of the present invention is configured with more than one bendable tab on each side of the apparatus. Such an embodiment is shown in FIGS. 7 and 8. In this embodiment, apparatus 500 comprises housing structure 502 that comprises front wall 503, rear wall 504, side wall 505, an opposite side wall (not shown) and a bottom section 506. Housing structure 502 also includes a top section (not shown) that is similar to top section 112 (see FIGS. 1A and 1B). The aforesaid top section of housing structure 502 comprises a central section (similar to central section 114) and a first pair of bendable tabs 510 and 512 that extend from this central section of housing structure 502. The top section of housing structure 502 further includes a second pair of bendable tabs (not shown)

that extend from the corresponding central section and are located on the other side of housing structure 502. The top section of housing structure 502 includes a pair of openings in the form of transverse slots (similar to transverse slot 124) which allow bendable tabs 510 and 512 to be bent downward 90° with respect to the central section so that the bendable tabs 510 and 512 are adjacent to sidewall 505. The top section of housing structure 502 also includes another pair of openings (i.e. transverse slots) on the opposite side to allow the bendable tabs (not shown) on the opposite side of housing structure 502 to be bent downward 90° with respect to the central section of housing structure 502. Bendable tab 510 has at least one opening 520 that is in the form of a transverse slot. In a preferred embodiment, bendable tab 510 has a plurality of transverse slots 520. Transverse slots 520 perform the same function as transverse slots 130. Bendable tab 512 has at least one opening 522 that is in the form of a transverse slot. In a preferred embodiment, bendable 512 has a plurality of transverse slots 522. Transverse slots 522 perform the same function as transverse slots 130. Bendable tab 510 has distal end 530. Bendable tab 512 has distal end 532. Bendable tab 510 has thru-hole 534. Similarly, bendable tab 512 has thru-hole 536. Thru-holes 534 and 536 have the same purpose and function as thru-holes 136 and 138 (see FIGS. 1A and 1B). Similarly, the bendable tabs on the other side (not shown) of housing structure 502 have the same structure and configuration as bendable tabs 510 and 512. FIG. 7 shows bendable tabs 510 and 512 bent downward 90° and adjacent to the sidewall 505 of housing structure 502. The bendable tabs (not shown) on the other side of housing structure 502 are also bent downward 90°. Referring to FIG. 8, a first portion of bendable tab 510 is bent along a transverse slot 520 to a 90° position with respect to a second portion of bendable tab 510. Similarly, a first portion of bendable tab 512 is bent along a transverse slot 522 to a 90° position with respect to a second portion of bendable tab 512. Apparatus 500 further comprises cover member 550 which has the same function as cover member 250. Apparatus 500 further includes an electrical power receptacle (not shown) and a device charging port (not shown) which provide the same functions as electrical power receptacle 160 and device charging port 202, respectively.

Various suitable materials can be used to fabricate the components of the apparatus of the present invention. For example, the cover members 250 and 550 can be fabricated from metal, plastic or PVC. Suitable metals are steel, stainless steel, chrome or aluminum. Housing structures 102 and 502 can be fabricated from metal such as steel, stainless steel, aluminum, iron, copper or brass.

In another embodiment, housing structure 102 is configured to use bend lines instead of transverse slots 124, 126, 130 and 132. In such an embodiment, the bend lines are used in place of slots 124, 126, 130 and 132. In one embodiment, the aforementioned bend lines are formed in accordance with the technique described in U.S. Pat. No. 6,484,980, entitled "Field Bendable Tab For Electrical Box Support." The disclosure of U.S. Pat. No. 6,484,980 is hereby incorporated by reference. In accordance with the technique described in U.S. Pat. No. 6,484,980, bend lines are defined by two or more discontinuous score lines formed in each bend line and which weaken the metal along the bend line to facilitate bending but permit straightening and rebending of the bendable tab when necessitated by field conditions and without the risk of substantially weakening or breaking the metal that forms the bendable tab.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An apparatus for providing utility receptacles (160, 202) on a work surface (400), comprising a housing structure (102) having a pair of sidewalls (104, 106), a rear wall (108) that is transversely attached to the sidewalls (104, 106) and a bottom section (110), wherein the sidewalls (104, 106) are substantially parallel to each other and substantially perpendicular to the rear wall (108) and the bottom section (110), the housing structure (102) further comprising a top section (112) that is attached to the sidewalls (104, 106), the top section (112) further comprising a central section (114) and at least one bendable tab (116) extending from the central section (114) to a distal end (120), the central section (114) having a transverse slot (124) along which the bendable tab (116) can be bent with respect to the central section (114), the bendable tab (116) having at least one transverse slot (130) along which a first portion (116A) of the bendable tab (116) can be bent with respect to a second portion (116B) of the bendable tab (116), the central section (114) having at least one opening (150) that is sized for receiving a utility receptacle.

2. The apparatus according to claim 1 wherein the transverse slot (124) of the central section (114) is located such that the bendable tab (116) can be bent to a position wherein the bendable tab (116) is adjacent to one of the sidewalls (104).

3. The apparatus according to claim 1 wherein the transverse slot (124) is located so that the bendable tab (116) can be bent 90° with respect to the central section (114).

4. The apparatus according to claim 2 wherein the sidewalls (104, 106) have equal lengths and the bendable tab (116) has a predetermined length that is relatively greater than the length of the sidewalls (104, 106) such that when the bendable tab (116) is bent so that it is adjacent to one of the sidewalls (104), the distal end (120) of the bendable tab (116) extends beyond a bottom edge (104A) of said one of the sidewalls (104).

5. The apparatus according to claim 1 wherein the at least one transverse slot (130) of the bendable tab (116) comprises a plurality of transverse slots (130).

6. The apparatus according to claim 5 wherein the transverse slots (130) are equidistantly spaced.

7. The apparatus according to claim 1 wherein the bendable tab (116) has a thru-hole (136).

8. The apparatus according to claim 1 wherein the central section (114) has a first end portion (114A) from which the bendable tab (116) extends and an opposite second end portion (114B), the top section (112) further comprising an additional bendable tab (118) extending from the opposite second end portion (114B).

9. The apparatus according to claim 8 wherein the central section (114) has a transverse slot (126) along which the bendable tab (118) can be bent with respect to the central section (114), wherein the transverse slot (126) is located so that the bendable tab (118) can be bent to a position such that the bendable tab (118) is adjacent to one of the sidewalls (106).

10. The apparatus according to claim 9 wherein the transverse slot (126) is located so that the bendable tab (118) can be bent 90° with respect to the central section (114).

11. The apparatus according to claim 1 wherein the top section (112) is also attached to the rear wall (108) and the bottom section (110) is also attached to the rear wall (108).

12. The apparatus according to claim 1 wherein the housing structure (102) further comprises a front wall (180) that is transversely attached to the sidewalls (104, 106) so as to form a compartment (190).

13. The apparatus according to claim 12 further comprising a cover member (250) attached to the top section (112), the cover member (250) having a first opening therein that is aligned with the opening (150) in the central section (114), the cover member (250) including a top side (252) and a bottom side (254).

14. The apparatus according to claim 13 further comprising a utility receptacle (160) that is positioned within the first opening (150) of the central section (114), the utility receptacle (160) having a rear portion (162) and front portion (164), wherein the rear portion (162) protrudes into the compartment (190).

15. The apparatus according to claim 14 wherein the front portion (164) of the utility receptacle (160) is within the first opening of the cover member (250).

16. The apparatus according to claim 14 wherein the utility receptacle (160) comprises an electrical power receptacle.

17. The apparatus according to claim 16 further comprising an electrical power cord (192) having a first end electrically connected to the electrical power receptacle (160) and a second end (194) adapted to be electrically connected to an electrical power source.

18. The apparatus according to claim 1 wherein the housing structure (102) further comprises a front wall (180) that is transversely attached to the sidewalls (104, 106) so as to form a compartment (190) and wherein the central section (114) has an additional opening (152) therein, the apparatus further comprising a device charging port assembly (200) positioned within the compartment (190), the device charging port assembly (200) comprising a device charging port (202), wherein the device charging port assembly (200) is positioned in the compartment (190) such that the device charging port (202) is aligned with the opening (152) in the central section (114).

19. The apparatus according to claim 18 wherein the device charging port (202) comprises a USB charging port.

20. The apparatus according to claim 18 wherein the device charging port assembly (200) further comprises electrical circuitry to convert an input voltage and current into an output voltage and current that is suitable for charging an electronic device.

21. The apparatus according to claim 20 further comprising an electrical power cord (192) having one end electrically connected to the device charging port assembly (200) and another end (194) adapted for connection to an electrical power source.

22. The apparatus according to claim 18 further comprising a cover member (250) attached to the top section (112), the cover member (252) having an opening (256) that is aligned with opening (152) of central section (114) so as to provide access to the device charging port (202).

23. An apparatus for providing utility receptacles on a work surface comprising a housing structure having a pair of sidewalls, a rear wall that is transversely attached to the sidewalls and a bottom section, wherein the sidewalls are substantially parallel to each other and substantially perpendicular to the rear wall and the bottom section, the housing structure further comprising a top section that is attached to the sidewalls, the top section further comprising a central section and at least one bendable tab extending from the central section to a distal end, the central section having a transverse slot along which the bendable tab can be bent with respect to the central section, wherein the transverse slot of the central section is located such that the at least one bendable tab can be bent to a position wherein the bendable tab is adjacent to one of the sidewalls, the at least one bendable tab having at least one transverse slot along which a first portion of the bendable tab can be bent with respect to a second portion of the bendable tab, the central section having at least one opening therein that is sized and shaped to receive a utility receptacle.

\* \* \* \* \*